(12) United States Patent
Levisse et al.

(10) Patent No.: US 11,708,148 B2
(45) Date of Patent: Jul. 25, 2023

(54) BLADE PIVOT WITH ADJUSTABLE ORIENTATION AND PROTECTED INTEGRITY FOR A TURBOMACHINE FAN HUB

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR); Vincent François Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/996,810

(22) PCT Filed: Apr. 13, 2021

(86) PCT No.: PCT/FR2021/050648
§ 371 (c)(1),
(2) Date: Oct. 21, 2022

(87) PCT Pub. No.: WO2021/214399
PCT Pub. Date: Oct. 28, 2021

(65) Prior Publication Data
US 2023/0131839 A1    Apr. 27, 2023

(30) Foreign Application Priority Data
Apr. 23, 2020   (FR) ....................................... 2004053

(51) Int. Cl.
*B64C 11/06*    (2006.01)
*F01D 5/30*     (2006.01)

(52) U.S. Cl.
CPC ................ *B64C 11/06* (2013.01); *F01D 5/30* (2013.01)

(58) Field of Classification Search
CPC ............. F05D 2260/80; F05D 2260/83; F05D 2230/60; F05D 2220/36; F01D 21/003;
(Continued)

(56) References Cited

U.S. PATENT DOCUMENTS 2,650,864 A * 9/1953 Mergen ................. F16C 19/182
416/204 R
2008/0279689 A1* 11/2008 Sebald .................. F16C 19/543
416/174

(Continued)

FOREIGN PATENT DOCUMENTS

EP    2535519 A2    12/2012
EP    2677121 A2    12/2013
(Continued)

OTHER PUBLICATIONS

International Search Report with English Translation and Written Opinion issued in International Application No. PCT/FR2021/050648 dated Jul. 28, 2021 (11 pages).

(Continued)

*Primary Examiner* — Woody A Lee, Jr.
*Assistant Examiner* — Eric A Lange
(74) *Attorney, Agent, or Firm* — Bookoff McAndrews, PLLC

(57) ABSTRACT

The invention relates to a blade pivot with adjustable orientation for a turbomachine fan hub, comprising: a stud having a fastener configured to retain a blade root and coupling means for the transmission of a twist torque; a ball bearing for taking centrifugal forces having an inner ring and an outer ring; a first clamping nut intended to be screwed on an inner thread of the hub to ensure clamping of the outer (Continued)

ring of the ball bearing; a rolling-element bearing for taking transverse forces having an inner ring and a smooth outer ring; a locking ring mounted between these two inner rings to provide for them a respective transverse support; an anti-rupture sleeve carrying the inner ring of the rolling-element bearing for taking transverse forces and the terminal end of which is extended transversely beyond the outer ring of this bearing.

10 Claims, 3 Drawing Sheets

(58) Field of Classification Search
CPC ......... F01D 21/045; F01D 5/30; B64C 11/06; F04D 27/001
See application file for complete search history.

(56) References Cited

U.S. PATENT DOCUMENTS

| | | |
|---|---|---|
| 2010/0215499 A1 | 8/2010 | Lafont |
| 2017/0313404 A1 | 11/2017 | Colmagro |
| 2019/0010957 A1* | 1/2019 | Belmonte ............... B64C 11/06 |

FOREIGN PATENT DOCUMENTS

| | | |
|---|---|---|
| EP | 2677121 A3 | 7/2014 |
| FR | 3046403 A1 | 7/2017 |

OTHER PUBLICATIONS

French Search Report issued in International Application No. PCT/FR2021/050648 dated Dec. 17, 2020 (2 pages).

* cited by examiner

[Fig. 1]
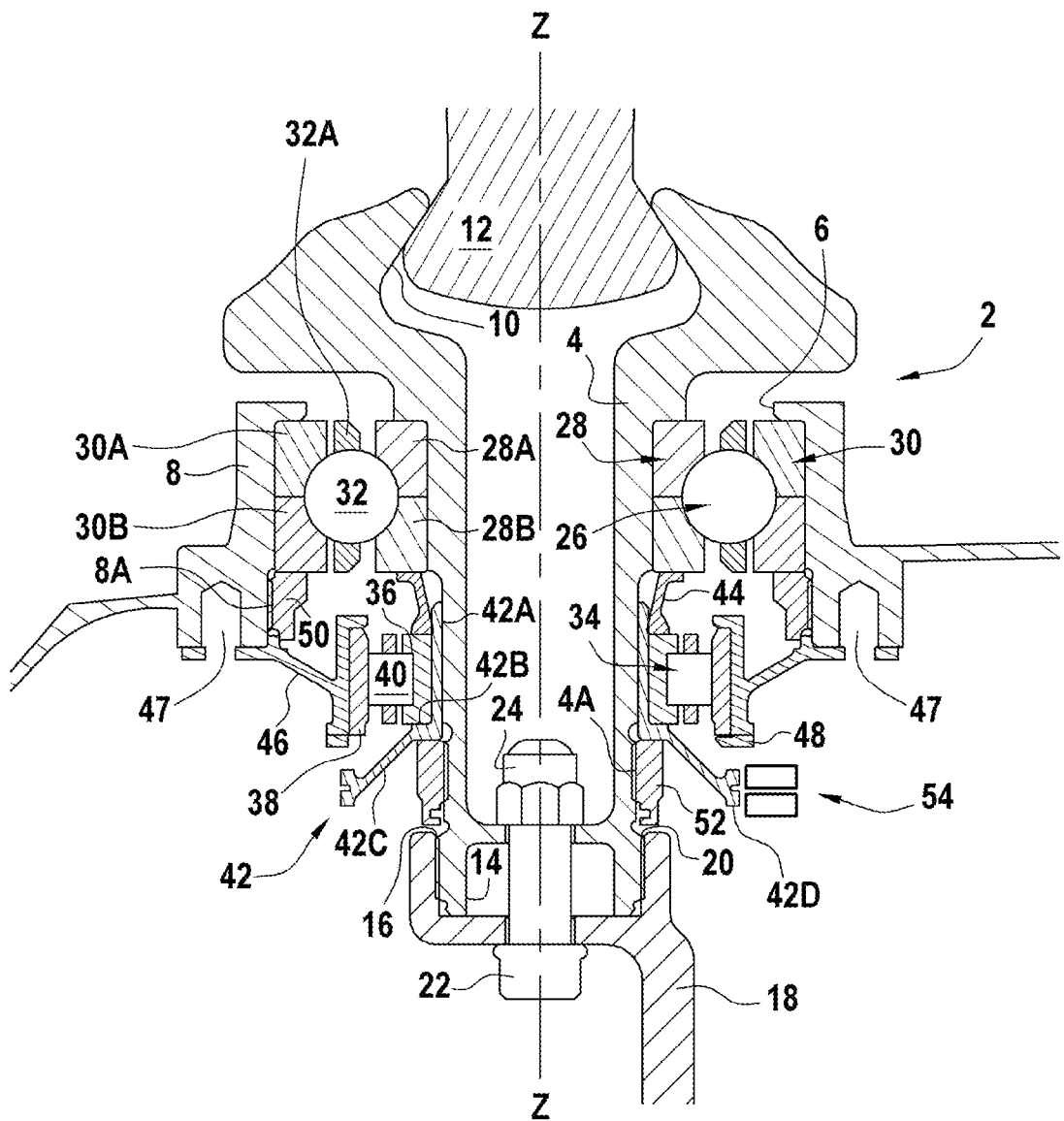

[Fig. 2A-2F]
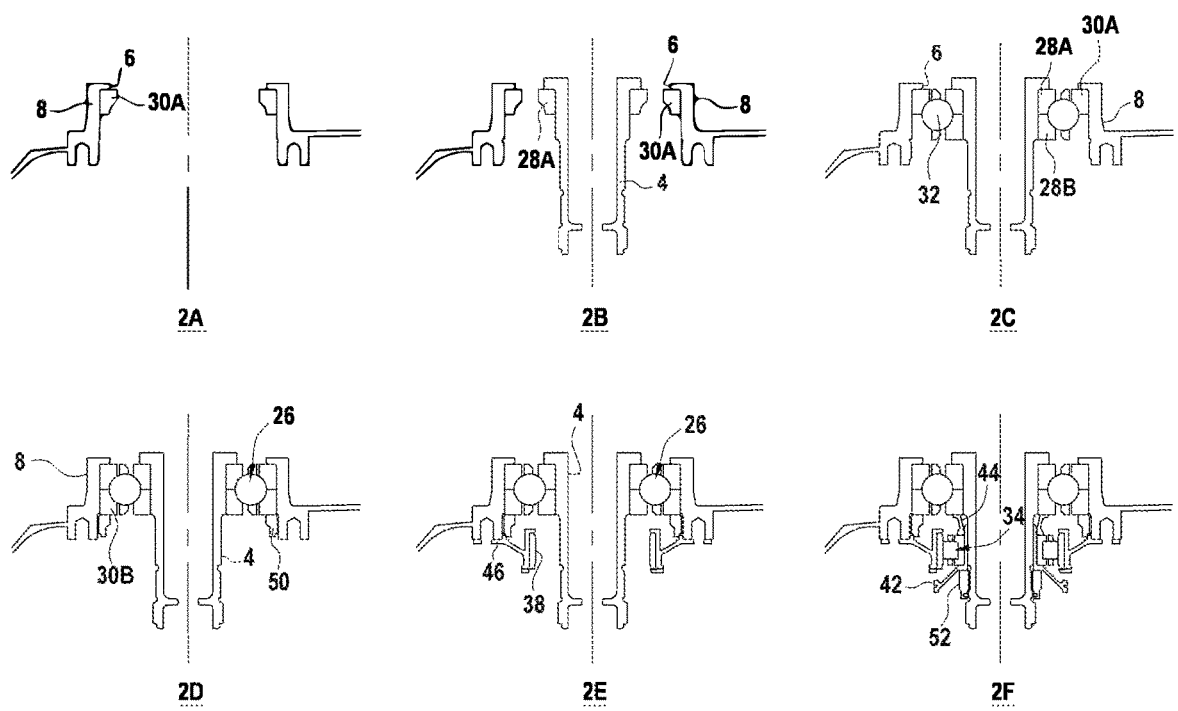

[Fig. 3]
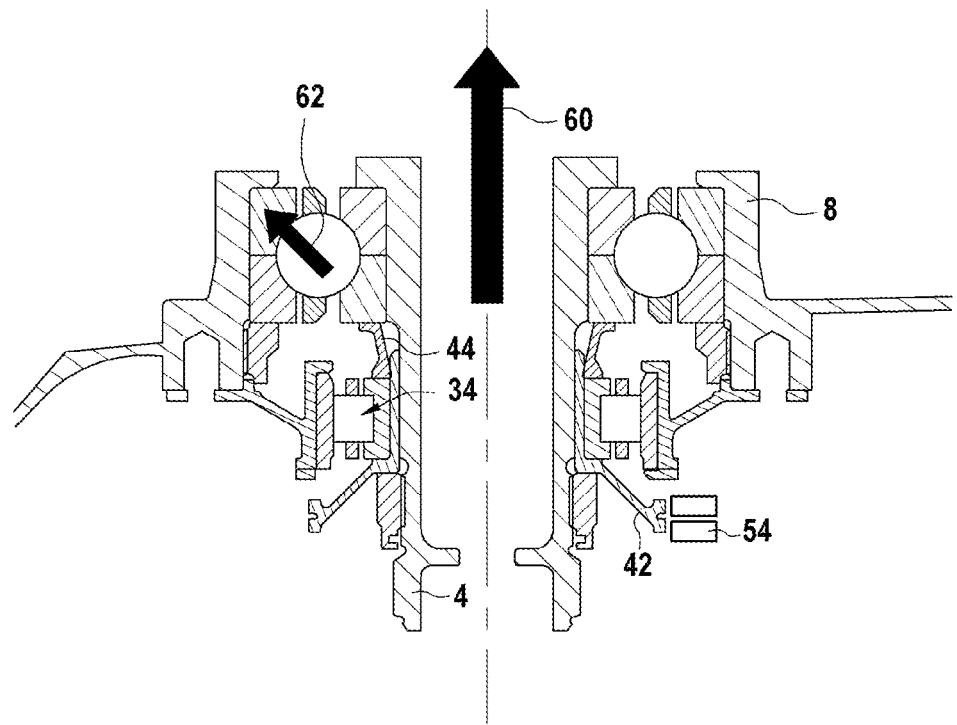
[Fig. 4]
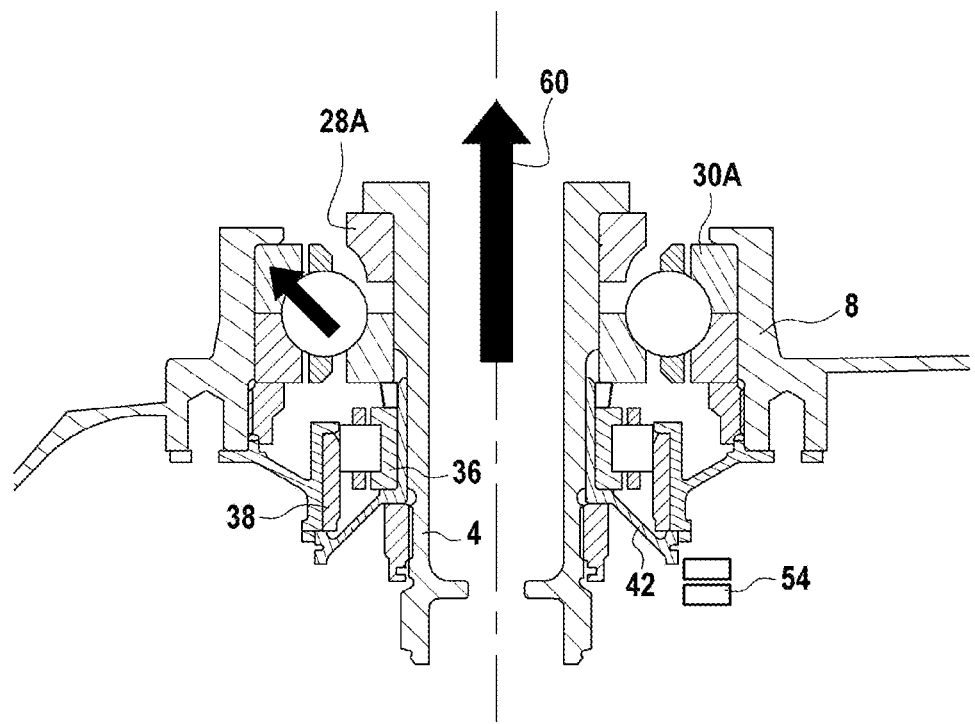

BLADE PIVOT WITH ADJUSTABLE ORIENTATION AND PROTECTED INTEGRITY FOR A TURBOMACHINE FAN HUB

CROSS-REFERENCE TO RELATED APPLICATION(S)

This patent application is a U.S. National Stage entry of International Application No. PCT/FR2021/050648, filed on Apr. 13, 2021, now published as WO 2021/214399 A1, which claims priority to French Application No. 2004053, filed on Apr. 23, 2020.

TECHNICAL FIELD

The present invention relates to the general field of turbomachines equipped with at least one shrouded or non-shrouded fan, and the fan blades of which (in the case of a shrouded fan) or the propeller blades (in the case of a non-shrouded fan) are equipped with a variable pitch setting system, and it concerns more particularly the control of the orientation of the fan blades of these turbomachines.

A preferred field of application of the invention is that of turbojets comprising a shrouded fan with a high bypass ratio (large fan diameter) and with a very low pressure ratio.

PRIOR ART

The operability of a turbojet with a high bypass ratio is ensured by introducing variability in the low-pressure module of the turbojet, this variability being activated depending on the phases of flight to restore sufficient pumping margin.

It is known to provide variability using a system for changing the pitch of the fan blades which is integrated into the hub of the fan. A blade pitch change system of this type also allows providing the function of thrust reversal which is no longer accomplished by the engine nacelle in this type of turbojet.

Moreover, in the fan module of a turbojet with a high bypass ratio, the radial retention of the fan blades is generally provided by the shape of the blade root and of the socket that receives it, by a pivot and its rolling-element bearings to take the set of forces to which the blade is subjected, by the fan blade in which the set of pivots is integrated.

It is possible for example to refer to publication FR 3,046,403 which describes an example of a fan blade retention architecture of this type. More precisely, in this publication, radial retention of each blade consists of a pivot comprising a fastener in the form of a bulb, of two ball bearings which allow taking the aerodynamic, inertial and centrifugal forces undergone by the blade and its pivot, by an eccentric linked by splines to the pivot, and by a hub integrating the set of pivots.

With an architecture of this type, the dimension of the hub of the fan depends directly on the integration of the pitch change mechanism of the blades, but also on the size of the rolling-element bearings of each pivot.

In fact, in the configuration described in publication FR 3,046,403, the inner rolling-element bearing takes all the centrifugal forces seen by the blade and its pivot. To minimize the transverse forces to be taken by this bearing, the inner and outer rolling-element bearings are highly spaced radially from one another. The inner rolling-element bearing is therefore not only the largest, but it is also placed on a very small radius of the hub so that the tangential space between the inner rolling-element bearings of the two adjacent blades is very restricted. The diameter of the hub of the fan is consequently impacted thereby.

But to optimize the efficiency of the fan of a turbojet with a high bypass ratio, it is desired to minimize the diameter of the hub of the fan and/or to integrate a greater number of blades with the same size hub.

DISCLOSURE OF THE INVENTION

The present invention therefore has the purpose of proposing an architecture of the pivots and of their rolling-element bearings which is less bulky.

Another purpose of the invention is also to propose an architecture allowing ensuring the retention of the blade under all conditions and in particular the retention of its rolling elements, even in the case of their rupture. In fact, the dimensioning of the debris retention system (airplane shielding or retention casing on the engine) is carried out on all the freed debris, and ensuring the retention of the rolling elements allows limiting the dimensioning of the airplane shielding to only the mass of the blade.

In conformity with the invention, this purpose is attained due to a blade pivot with adjustable orientation for a turbomachine fan hub, comprising:
- a stud having, at a first end, a fastener configured to retain a fan blade root and, at a second end, coupling means for the transmission of a twist torque;
- a ball bearing for taking centrifugal forces having an inner ring mounted transversely supported against an outer shoulder of the stud and an outer ring intended to be mounted transversely supported inside the fan hub;
- a first clamping nut intended to be screwed to an inner thread of the fan hub to ensure clamping of the outer ring of the ball bearing for taking centrifugal forces;
- a rolling-element bearing for taking transverse forces having an inner ring and a smooth outer ring intended to be mounted transversely supported inside the fan hub;
- a locking ring mounted between the inner ring of the ball bearing for taking centrifugal forces and the inner ring of the rolling-element bearing for taking transverse forces to ensure respective transverse support to these inner rings;
- an anti-rupture sleeve carrying the inner ring of the rolling-element bearing for taking transverse forces, the terminal end of which is extended transversely beyond the outer ring of the rolling-element bearing for taking transverse forces, so as to constitute a stop in the event of radial movement of the stud; and
- a second clamping nut screwed to an outer thread of the stud to ensure clamping of the respective inner rings of the ball bearing for taking centrifugal forces and of the rolling-element bearing for taking transverse forces.

The invention is notable in that it proposes a ball bearing having four points of contact which is positioned as far as possible radially from the engine axis to benefit from a maximum of space and thus be dimensioned to take the centrifugal forces seen by the blade and its pivot.

Likewise, with its structure for protection against the failure of the ball bearing, it provides the retention of these rolling elements taking the centrifugal forces even in case of their rupture (failsafe function). Thus, the entirety of the blade, of the pivot and of the rolling elements cannot be carried away in the event of a rupture, as is possible with pivots of the prior art, and this ejected assembly is therefore not of a nature to created high-energy debris strongly harmful to the engine and therefore more generally to the mission.

The contact created between the outer ring of the rolling-element bearing and the anti-rupture part guards the blade pivot from any rupture of the ball bearing.

As for transverse forces, smaller than the centrifugal forces, they are taken by a needle or roller bearing allowing accurate guidance and an improvement in compactness.

Preferably, the anti-rupture sleeve extends successively into a cylindrical portion, then an outwardly flared conical portion including the terminal end, the junction between these two portions forming a transverse support for the inner ring of the rolling-element bearing for taking transverse forces.

The pivot can further comprise a position sensor arranged facing a terminal end of the anti-rupture sleeve and intended to detect any radial movement of the stud, due for example to a rupture of the ball bearing for taking centrifugal forces.

Advantageously, the locking ring mounted between the inner ring of the ball bearing for taking centrifugal forces and the inner ring of the rolling-element bearing for taking transverse forces can be a centrifugally fusible ring.

Preferably, the anti-rupture sleeve is shrunk onto the pivot.

Advantageously, the clamping of the inner rings of the ball bearing for taking centrifugal forces and of the rolling-element bearing for taking transverse forces by the second clamping nut is carried out via the anti-rupture sleeve and the locking ring.

Preferably, the inner ring and the outer ring of the ball bearing for taking centrifugal forces are produced in two distinct portions in order to facilitate the mounting of the pivot.

The invention also has as its object a turbomachine fan, comprising at least one blade with adjustable orientation, the hub of which is assembled on a pivot as previously defined, as well as a turbomachine comprising a fan of this type.

The invention also has as its object a method for mounting a pivot as previously defined, comprising successively: lowering the pivot into a fan hub; mounting the ball bearing for taking centrifugal forces to a first end of the stud; clamping the ball bearing for taking centrifugal forces by screwing the first clamping nut on the inner thread of the hub; mounting the retention ring carrying the smooth outer ring of the rolling-element bearing for taking transverse forces transversely supported inside the hub; mounting the anti-rupture sleeve to a second end of the stud, the anti-rupture sleeve carrying the remaining portions of the rolling-element bearing for taking transverse forces as well as a fusible locking ring; and clamping the rolling-element bearing for taking transverse forces by screwing the second clamping nut.

BRIEF DESCRIPTION OF THE DRAWINGS

FIG. 1 is a section view showing a blade pivot with adjustable orientation according to one embodiment of the invention.

FIGS. 2A to 2F show an example of mounting a pivot according to the embodiment of FIG. 1.

FIG. 3 illustrates the configuration of the pivot according to the invention in normal operation.

FIG. 4 illustrates the configuration of the pivot according to the invention in the event of a failure.

DESCRIPTION OF THE EMBODIMENTS

FIG. 1 shows a blade pivot comprising several distinct elements which are assembled together so as to facilitate their mounting/disassembly in a rotary fan blade hub and having as their function to ensure retaining a fan blade on this rotary hub and guiding it for the setting of its pitch.

As is known, the pivot of each fan blade is mounted radially in an opening of the hub of the fan which passes through it from side to side, the hub being centered on the longitudinal axis of the turbojet, the architecture of which, also well known to a person skilled in the art, will not be described here in detail.

According to the invention, the pivot 2 comprises a stud 4 which extends along the radial axis Z-Z of the pivot through an opening 6 of the hub 8 of the fan. This stud 4 has, at an external radial end (i.e. at its end farthest from the longitudinal axis of the turbojet), a fastener 10, for example in the form of a bulb, which is intended to receive a root 12 of the fan blade. Of course, other means of retaining the root of the blade could be considered.

At its internal radial end (i.e. at its end closest to the longitudinal axis of the turbojet), the stud 4 comprises outer splines 16 for transmitting a twist torque to an eccentric 18 (also known by the term setting transmission ring), also equipped with splines 20 carried on its inner surface and intended to cooperate with the outer splines 16 of the stud 4. Of course, other means of coupling for the transmission of the twist torque can be considered.

This setting transmission ring 18 is intended to transmit the twist torque to the pivot of the blade to change its pitch setting. It is locked to the stud by means of a screw 22 centered on the radial axis Z-Z and a nut 24 clamped on said screw.

The pivot also comprises rolling-element bearings for taking centrifugal forces (i.e. along the radial axis Z-Z) and transverse force (i.e. along a plane perpendicular to the radial axis Z-Z) seen by the blade and its pivot.

More precisely, the pivot comprises a ball bearing 26 which is intended to take centrifugal forces. This ball bearing 26 is equipped with an inner ring 28 which is mounted transversely supported against an outer shoulder of the stud 4.

Preferably, the inner ring 28 is formed from two distinct portions 28a, 28b. This feature allows facilitating the mounting of the pivot as will subsequently be detailed.

This ball bearing 26 also comprises an outer ring 30 which is intended to be mounted transversely supported inside the opening 6 of the hub 8 of the fan, and can also be formed in two distinct portions 30a, 30b to also facilitate the mounting of the pivot, the inner 28 and outer 30 rings defining rolling paths for a plurality of balls 32 retained in a central cage 32A.

To take the transverse forces, the pivot also comprises a needle or roller bearing 34 which is offset radially inward with respect to the ball bearing 26.

This needle or roller bearing 34 comprises an inner ring 36 and a smooth outer ring 38, the inner ring 36 and the smooth outer 38 ring defining rolling paths for a plurality of needles or rollers 40 possibly held in a central cage.

More precisely, the inner 36 ring is mounted on an anti-rupture sleeve 42, shrunk for example onto the stud 4 and which extends along the axis Z-Z successively in a cylindrical portion 42A, then an outwardly flared conical portion 42B, the junction of between these two portions forming a transverse support 42C for the inner ring 36 which is further pressurized by a locking ring 44, advantageously centrifugally fusible, the dimensions of which can be calibrated so that this ring burns starting at a certain centrifugal force. The fusible stop ring can serve as an indicator of the condition of the rolling paths by allowing the detection of radial forces capable of damaging these rolling paths. In fact, if a large radial force occurs, the fusible ring is damaged, which is detected by at least one of the sensors described above.

The smooth outer ring 38, for its part, is mounted transversely supported inside the opening 6 of the hub 8 of the fan via a flexible flange or a perforated support ring 46 attached at its circumference by screws to the hub 8, as illustrated by the screw holes 47.

This perforated support ring 46 (a crenelated shape could also be considered) has the advantage of conferring flexibility on the smooth outer ring 38 which allows it to prevent the propagation of vibrations in the rest of the pitch setting system during events in flight such as impacts on the fan blades by outside elements. An anti-rotation ring or an elastic clamping ring 48 of the "circlips" type, for example, allows locking this ring in position by retaining the outer ring of the bearing.

The anti-rupture sleeve includes, in its conical portion, a terminal end 42D which is extended transversely beyond the smooth outer ring 38 of the rolling-element bearing for taking transverse forces, so as to constitute a stop in the event of radial movement of the stud, this terminal portion then coming into contact with the smooth outer ring, itself supported transversely on the hub 8 of the fan.

A first clamping nut 50 intended to be screwed to an inner thread 8A of the hub 8 allow ensuring clamping against it of the outer ring 30 of the ball bearing 26 for taking centrifugal forces.

A second clamping nut 52 is screwed to an outer thread 4A of the stud 4 to ensure clamping of the inner ring 28 of the ball bearing 26 for taking centrifugal forces to the stud, through the chain of successive supports formed by the anti-rupture sleeve 42, the inner ring 36 of the needle or roller bearing 34 and the locking ring 44.

A position sensor 54 is further placed facing the terminal end 42D of the anti-rupture sleeve 42 in order to detect the rupture of the ball bearing 26. In fact, the alteration or the loss of signal due to a radial movement of the anti-rupture sleeve will be detected by this position sensor.

It will be noted, however, that this failure can also be detected by the unbalance detectors of the engine because the failure of a bearing offsets the blade root, causing an unbalance on the rotor (in the event, however, that the failure involves only one of the pivots).

Likewise, in the event of buckling of the fusible locking ring, the anti-rupture sleeve will also no longer be facing the position sensor. This allows detecting overspeed, for example. In fact, fans with pitch settings can pass through settings where the fan no longer consumes power and accelerates strongly, driving overspeeds.

In connection with FIGS. 2A to 2F, an example of mounting the pivot according to the invention will now be described.

During a first step illustrated by FIG. 2A, the outer half-ring 30a of the ball bearing 26 is mounted transversely supported inside the opening 6 of the hub 8 of the fan (it is, for example, shrunk).

Then, as shown in FIG. 2B, the stud 4 is then lowered radially into the opening 6 of the hub 8, the stud being previously equipped (by shrinking for example) with the inner half ring 28A of the ball bearing 26.

In a third step illustrated in FIG. 2C, the other inner half-ring 28b of the ball bearing 26 is then mounted to form the inner ring 28, then the balls 32 of this rolling-element bearing are mounted with their cage 32A.

In the step of FIG. 2D, the outer half-ring 30B of the ball bearing 26 is then mounted and retained by clamping the first clamping nut 50.

In the following step (FIG. 2E), the outer ring 38 of the needle or roller bearing 34 and the support ring 46 are mounted in their turn inside the opening 6 of the hub 8 of the fan. The support ring 46 is fastened to the hub 8 by the screws (openings 47) and the assembly is locked into position by means of the anti-rotation ring 48.

Then in step 2F, the smooth inner ring 38 and the rolling elements of the rolling-element bearing 34 are engaged around the stud 4 with the fusible portion 44 previously mounted on the anti-rupture sleeve 42 before being locked by clamping the second clamping nut 52.

Finally, in a final step (corresponding to FIG. 1), the root 12 of the blade can be mounted in the fastener 10 in the form of a bulb provided at the outer radial end of the stud 4, it being understood that the setting transmission ring 18 had been previously mounted at the end of the stud 4 by having their respective splines 16, 20 cooperate, and it had been locked by mounting the screw 22 and clamping the nut 24.

FIGS. 3 and 4 illustrate the configuration of the pivot according to the invention respectively in normal operation and in the event of a failure.

In the normal operating position, the position sensor 54 is placed facing the terminal end 42D of the conical portion of the anti-rupture sleeve. Label 60 refers to the radial load exerted on the pivot and label 62 to the load transfer toward the hub. It should be noted that the second nut 52 located on the pivot then blocks then entire assembly.

In the failure position, in this case of the fusible ring 44 (but the case would be identical in the event of rupture of the ball bearing 26), the radially outward movement of the set of elements linked to the pivot, particularly the sliding of the rollers 40 on the smooth outer ring 38, is noted. It will be noted that, the ball 32 being in abutment on the remaining half-ring, the radial loads can however still transit toward the hub 8.

The offset of the anti-rupture sleeve with respect to the position sensor allows identifying that the pivot is no longer in its normal operating position, the anti-rupture sleeve stopping the subsequent movement of the pivot which will come into abutment on the rolling support and thus avoid any loss of elements.

It will be noted that it can be contemplated to place fusible elements only on certain blades, unequally distributed angularly. Thus, only a certain portion of the blades would see their fusible parts burn, thus causing an unbalance which could be detected by the standard unbalance sensors of the engine.

It will also be noted that the position sensor can also serve as a pitch setting sensor, which avoids integrating an additional sensor in a zone that is already crowded.

The invention claimed is:

1. A blade pivot with adjustable orientation for a turbomachine fan hub, comprising:
   a stud having, at a first end, a fastener configured to retain a fan blade root and, at a second end, coupling means for the transmission of a twist torque;
   a ball bearing for taking centrifugal forces having an inner ring mounted transversely supported against an outer shoulder of the stud and an outer ring intended to be mounted transversely supported inside the fan hub;
   a first clamping nut intended to be screwed to an inner thread of the fan hub to ensure clamping of the outer ring of the ball bearing for taking centrifugal forces;

a rolling-element bearing for taking transverse forces having an inner ring and a smooth outer ring intended to be mounted transversely supported inside the fan hub;

a locking ring mounted between the inner ring of the ball bearing for taking centrifugal forces and the inner ring of the rolling-element bearing for taking transverse forces to ensure respective transverse support to these inner rings;

an anti-rupture sleeve carrying the inner ring of the rolling-element bearing for taking transverse forces, the terminal end of which is extended transversely beyond the outer ring of the rolling-element bearing for taking transverse forces, so as to constitute a stop in the event of radial movement of the stud; and a second clamping nut screwed to an outer thread of the stud to ensure clamping of the respective inner rings of the ball bearing for taking centrifugal forces and of the rolling-element bearing for taking transverse forces.

2. The pivot according to claim 1, wherein the anti-rupture sleeve extends successively into a cylindrical portion, then an outwardly flared conical portion including the terminal end, the junction between these two portions forming a transverse support for the inner ring of the rolling-element bearing for taking transverse forces.

3. The pivot according to claim 2, further comprising a position sensor arranged facing a terminal end of the anti-rupture sleeve and intended to detect any radial movement of the stud.

4. The pivot according to claim 1, wherein the locking ring mounted between the inner ring of the ball bearing for taking centrifugal forces and the inner ring of the rolling-element bearing for taking transverse forces is a centrifugally fusible ring.

5. The pivot according to claim 1, wherein the anti-rupture sleeve is shrunk onto the stud.

6. The pivot according to claim 1, wherein the clamping of the respective inner rings of the ball bearing for taking centrifugal forces and of the rolling-element bearing for taking transverse forces by the second clamping nut is carried out via the anti-rupture sleeve and the locking ring.

7. The pivot according to claim 1, wherein the inner ring and the outer ring of the ball bearing for taking centrifugal forces are produced in two distinct portions in order to facilitate the mounting of the stud.

8. A turbomachine fan, comprising at least one blade with adjustable orientation, the hub of which is assembled on a pivot according to claim 1.

9. A turbomachine comprising a fan according to claim 8.

10. A method for mounting a pivot according to claim 1, comprising successively: lowering the stud into a fan hub; mounting the ball bearing for taking centrifugal forces to a first end of the stud; clamping the ball bearing for taking centrifugal forces by screwing the first clamping nut on the inner thread of the hub; mounting the retention ring carrying the smooth outer ring of the rolling-element bearing for taking transverse forces transversely supported inside the hub; mounting the anti-rupture sleeve to a second end of the stud, the anti-rupture sleeve carrying the remaining portions of the rolling-element bearing for taking transverse forces as well as a fusible locking ring; and clamping the rolling-element bearing for taking transverse forces by screwing the second clamping nut.

* * * * *